(12) United States Patent
Heuts et al.

(10) Patent No.: US 6,993,082 B2
(45) Date of Patent: Jan. 31, 2006

(54) STATION AND METHOD FOR OPERATING A CAN COMMUNICATION LINE

(75) Inventors: Patrick Willem Hubert Heuts, Nijmegen (NL); Aloysius Johannes Maria Boomkamp, Nijmegen (NL); Robert Mores, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 883 days.

(21) Appl. No.: 09/912,134

(22) Filed: Jul. 24, 2001

(65) Prior Publication Data

US 2002/0054647 A1    May 9, 2002

(30) Foreign Application Priority Data

Jul. 25, 2000  (EP) ................................. 00202675

(51) Int. Cl.
*H04B 3/00*       (2006.01)

(52) U.S. Cl. .................................................. 375/257

(58) Field of Classification Search ................ 375/219, 375/220, 228, 257, 285, 256, 259, 295; 370/242, 370/245, 252, 364–365, 217, 221, 282, 359, 370/419, 421, 463; 714/721, 723, 712, 43, 714/56; 327/77, 80, 87, 74, 78, 82
See application file for complete search history.

(56) References Cited

U.S. PATENT DOCUMENTS

| | | | | |
|---|---|---|---|---|
| 5,448,180 A | * | 9/1995 | Kienzler et al. | ............... 326/15 |
| 5,765,031 A | * | 6/1998 | Mimuth et al. | ............... 714/43 |
| 5,784,547 A | * | 7/1998 | Dittmar et al. | ................ 714/4 |
| 5,933,459 A | * | 8/1999 | Saunders et al. | ........... 375/317 |
| 6,111,888 A | * | 8/2000 | Green et al. | ................ 370/461 |
| 6,115,831 A | * | 9/2000 | Hanf et al. | .................... 714/43 |
| 6,208,924 B1 | * | 3/2001 | Bauer | ........................... 701/45 |
| 6,262,602 B1 | * | 7/2001 | Draving | ........................ 327/74 |
| 6,600,723 B1 | * | 7/2003 | Reeb et al. | .................. 370/245 |

* cited by examiner

*Primary Examiner*—Khanh Tran
(74) *Attorney, Agent, or Firm*—Adam L. Stroud

(57) ABSTRACT

A CAN communication line is operated whilst detecting a ground level shift on the communication line through storing a data element indicative for the shift. In particular, a current line voltage level is compared to a standard level, and a thresholded version of the comparison is fed to a storage element that is triggered by a local transmission indicator signal. Then a ground shift sample bit from the storage element is outputted.

9 Claims, 2 Drawing Sheets

STATION AND METHOD FOR OPERATING A CAN COMMUNICATION LINE

BACKGROUND OF THE INVENTION

The invention relates to a method for operating a low-speed CAN communication line using a flipflop-based CAN transceiver whilst detecting a ground level shift, according to the preamble of claim 1. Background art referencing is provided by the ISO 11898 Specification Standard and the earlier art ISO 115 119 incorporated therein. Present day communication line systems need a reliable detection of an actual ground level, and as the case may be, of a shift in such ground level, to thereby correctly assess the actual binary information value and to ensure the proper operation of a bus failure management. Technically, it is possible to compare one line/bus level with the actual ground level, and to use the information so gathered for effecting the communication proper. Now, a too large or too small difference between the excitation signal and ground may indicate a particular ground shift. Such difference may be sampled repeatedly during operating the communication. It has been recognized that taking a single sample of the ground shift may be insufficiently reliable, and furthermore, that repeating such sampling will in many situations not improve that situation.

A further problem is presented by the fact that the line in question could be connected to various stations that operate according to individual non-uniform synchronizations. This may result in interference between the various stations, so that a transmitting station may detect a faulty ground shift caused by the various propagation delays that may play a part. In particular, during bus arbitration, various stations may start at mutually uncontrolled instants. The situation will even deteriorate when an acknowledge bit will signal a correct message reception at the receiver, because various slaves will not be synchronized.

SUMMARY TO THE INVENTION

In consequence, amongst other things, it is an object of the present invention to provide a method for reliably and inexpensively detecting a ground shift, which method can be guaranteed through a simple software routine. It has been found that often the cheapest solution is to use a single flipflop to store only the most recently sampled ground shift value. The ground shift detection flipflop contains valid information only at the end of a message sent by the associated station. Such is true in any case after the arbitration has finished, because subsequently, no delay problems will exist anymore. A successful message transmission may cause generating a transmit interrupt signal.

Reference is had already to FIG. 1, that will be discussed more in detail hereinafter. Now, a transmit interrupt signal may emanate from block 26. If the bus failure management in block 28 does not report a bus error, the above-mentioned software routine should read the ground shift flip flop before transmission of a next bit of the dominant value. Such dominant bit may be transmitted as acknowledging correct message reception or for starting a next message.

A particular further problem to be solved is the following. It may occur that after a transmitting CAN controller has signalled a transmit interrupt to the microcontroller, another connected CAN controller will put an error/overload flag on the same CAN bus. Such is conventionally effected through transmitting six dominant bits. In this case, the CAN controller will automatically react with transmitting an error/overload flag on the CAN bus, also represented by six dominant bits. Such will not be reported by the microcontroller at the receiving end, but will be handled completely within the associated CAN controller, as it is a part of the standard CAN procedure. Now, to avoid overwriting of a ground shift sample, such sample will not be updated while the CAN transceiver is receiving dominant bits, RxD=0. Also the handling of the above-sketched problem situation is an object of the present invention.

Now therefore, according to one of its aspects the invention is characterized according to the characterizing part of claim 1.

The invention also relates to a station, a station-and-line system, and a multi-device system arranged for implementing the invention as claimed in claims 6, 7 and 8, respectively. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
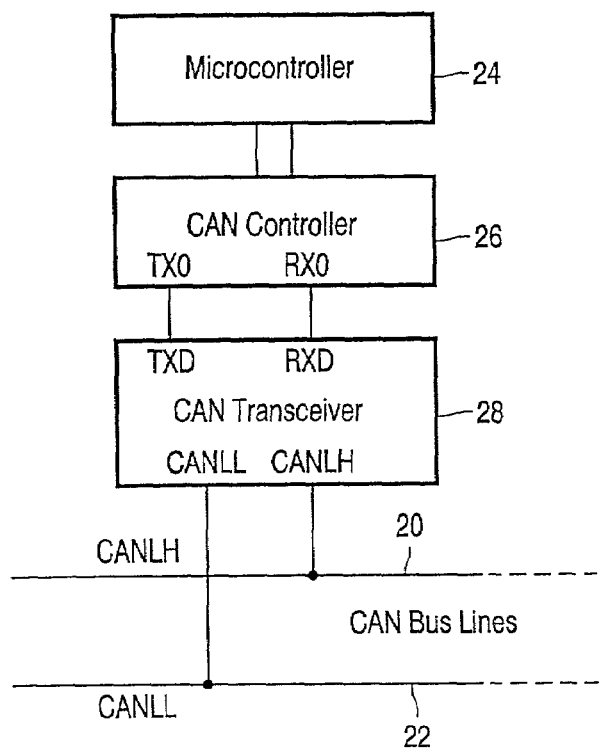
FIG. 1, a block diagram of a station/node arrangement according to the invention.

FIG. 1 illustrates by way of non-limiting example a block diagram of an arrangement according to the invention, and in particular for use with the Controller Area Network or CAN that is based on two parallel bus lines CAN_H(igh) 20 and CAN_L(ow) 22. Both bus lines attach to the single station that has been illustrated by way of example, but which may represent various stations in parallel. The station has three hierarchically organized subsystems 24, 26, 28. The highest layer is microcontroller 24 that can execute user and/or system software and will communicate with the next lower level through appropriate signalization patterns. Note that the transmit interrupt from block 26 will trigger the software routine for reading the ground shift flag in block 28.

The second layer is CAN controller 26, which is arranged for formatting and communicating system and user data for use on the net or bus, and for implementing an appropriate bus protocol, inclusive of deciding the direction of such communicating, and the associated addressing, packaging and possibly error protection features. The vehicle for the communicating is the TX0/RXO signal pair as indicated, that on the transceiver is represented by the TxD and RxD signal pair, respectively.

The third level is CAN transceiver 28, which is arranged for effecting the lowest level communication aspects, inclusive of the generating of the CAN bus signals CAN_H and CAN_L as indicated.

Figure 2:
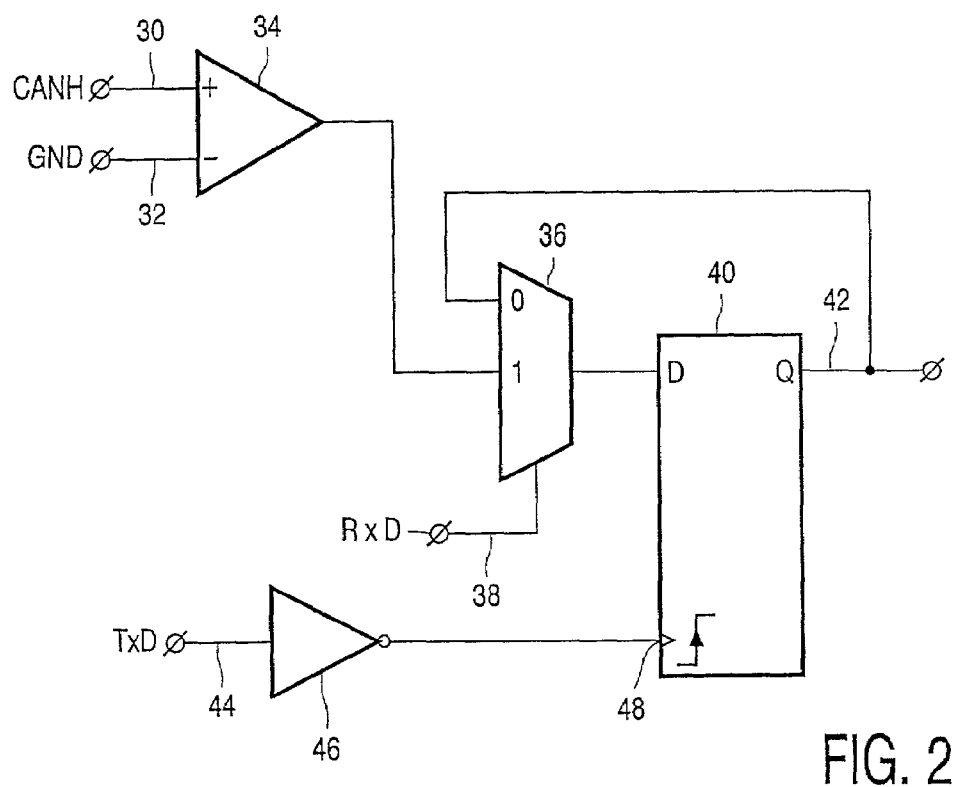
FIG. 2, functional principal electronic circuitry for implementing the invention.

FIG. 2 illustrates electronic circuitry for implementing the invention. One of the two bus lines, here CAN_H 30, and overall ground are fed into an accurate comparator 34 as shown. This comparator will output a logic "1" if (CAN_H-GND)<−1,2 volts. Generally, tolerances for this threshold value are in the region of 320%. On the other hand, this comparator will output a logic "0" if (CAN_H-GND)>−1,2 volts. Note that corresponding values will apply when operating on the other signalling level. The output signal is fed into the "1" input of multiplexer 40, that is controlled by a representation of the RxD signal received in transceiver module 28 in FIG. 1. The output of multiplexer 36 feeds the data or "D" input of flipflop 40 that loads under control of a rising-edge of the signal from inverter 46. The inverter inverts a signal TXD received on input 44. Output 42 therefore carries a ground shift sample bit that is retro-coupled to the 0 input of multiplexer 36, so that the stored bit is kept persistent, in the case of an overload frame.

Figure 3:
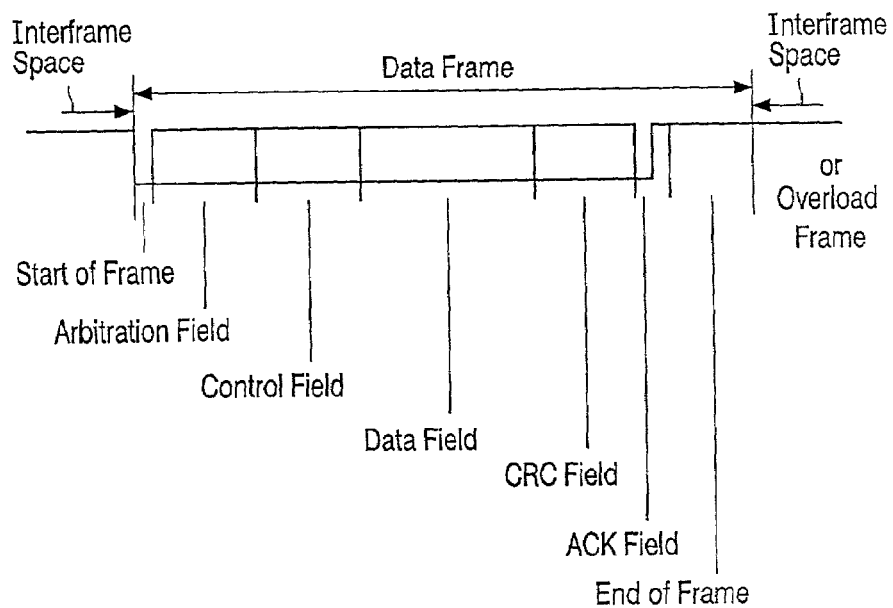
FIG. 3, an exemplary frame format of a CAN bus for implementing the invention.

FIG. 3 illustrates an exemplary data frame format of a CAN bus as a non-limiting vehicle for implementing the invention. Following an interframe space a control field, a data field, a CRC check sum field, an ACKnowledge field, and an end-of-frame signalization. The next interframe space allows an overload frame if relevant.

Figure 4:
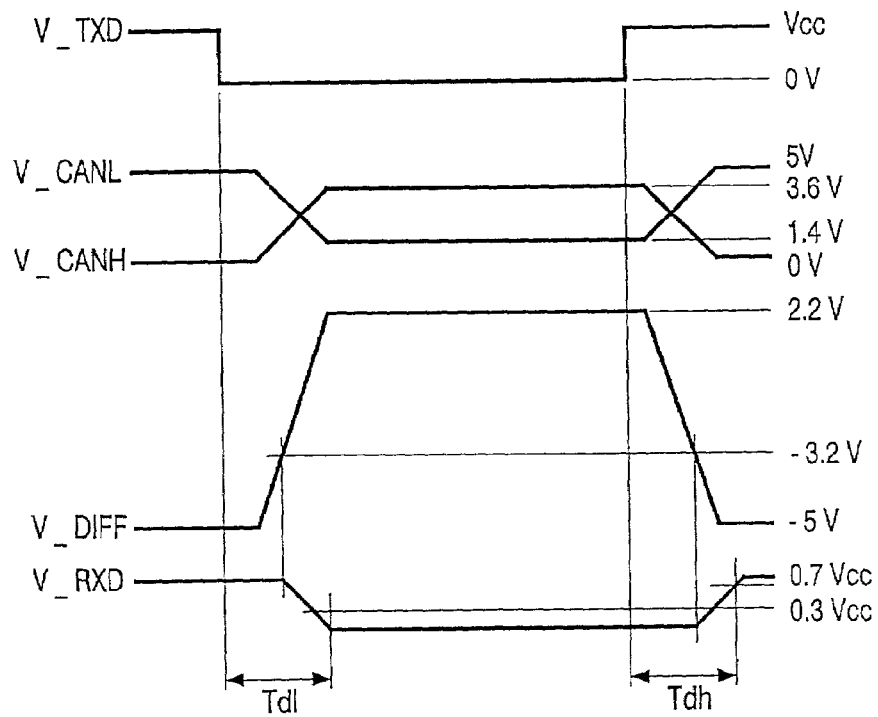
FIG. 4, a CAN bus signal trace arrangement generated by the low-speed CAN transceiver according to the invention.

FIG. 4 illustrates CAN bus signal traces as generated in the embodiment. Reference is had to the subsystem arrangement of FIG. 1. The top trace is the output from controller 26, which drives transitions on the complementary bus lines (28), from 5 to 1.4, and from 0 to 3.6 volts, respectively. The next trace is the differential that goes from −5 volts to +2.2 volts, and whereof a −3.2 threshold level the V_RXD that actuates multiplexer 36 in FIG. 2. Shown in particular are the delay between the edges of V_TXD and the V_RXD reaching its new level.

What is claimed is:

1. A method of operating a Controller Area Network communication line, comprising:
    comparing a first Controller Area Network bus line having a first voltage thereon, to a ground level;
    generating a first signal, where the first signal is a logic "1" if the difference between the first Controller Area Network bus line and the ground level is less than a first voltage; and the first signal is a logic "0" if the difference between the first Controller Area Network bus line and the ground level is greater than the first voltage;
    selecting the first signal as an input signal to an edge-triggered flip-flop if a receive data signal is in a first one of two states, and selecting an output signal of the edge-triggered flip-flop as an input signal to the edge-triggered flip-flop if the receive data signal is in a second one of two states; and
    clocking the edge-triggered flip-flop when a transmit data signal changes state.

2. The method of claim 1, wherein the first voltage is −1.2 volts.

3. The method of claim 1, wherein the first voltage has a tolerance in the region of 320%.

4. The method of claim 1, the edge-triggered flip-flop is a positive edge-triggered flip-flop, and the edge-triggered flip-flop is clocked when the transmit data signal changes state from a high level to a low level.

5. An apparatus for operating a Controller Area Network communication line, comprising:
    a means for comparing a first Controller Area Network bus line having a first voltage thereon, to a ground level;
    a means for generating a first signal, where the first signal is a first logical value if the difference between the first Controller Area Network bus line and the ground level is less than a first voltage; and the first signal is a second logical value, if the difference between the first CAN bus line and the ground level is greater than the first voltage;
    a means for selecting the first signal as an input signal to an edge-triggered flip-flop if a receive data signal is in a first one of two states, and selecting an output signal of the edge-triggered flip-flop as an input signal to the edge-triggered flip-flop if the receive data signal is in a second one of two states; and
    a means for clocking the edge-triggered flip-flop when a transmit data signal changes state.

6. The apparatus of claim 5, wherein the first voltage is −1.2 volts.

7. The apparatus of claim 5, wherein the first voltage has a tolerance in the region of 320%.

8. The apparatus of claim 5, wherein the first logical value is "1" and the second logical value is "0".

9. The apparatus of claim 5, wherein the clocking of the edge-triggered flip-flop occurs responsive to a high-to-low transition of the transmit data signal.

* * * * *